(12) United States Patent
Maldonado

(10) Patent No.: US 8,516,783 B1
(45) Date of Patent: Aug. 27, 2013

(54) EDGING AND TRIMMING APPARATUS FOR ATTACHMENT TO LAWN MOWERS

(76) Inventor: Ralph Maldonado, Encinitas, CA (US)

( * ) Notice: Subject to any disclaimer, the term of this patent is extended or adjusted under 35 U.S.C. 154(b) by 0 days.

(21) Appl. No.: 13/374,936

(22) Filed: Jan. 24, 2012

(51) Int. Cl.
*A01D 34/00* (2006.01)

(52) U.S. Cl.
USPC .............................. 56/13.7; 56/12.7

(58) Field of Classification Search
USPC ........... 56/12.7, 13.7, 16.9, 17.1, 17.5
See application file for complete search history.

(56) References Cited

U.S. PATENT DOCUMENTS

| | | | | |
|---|---|---|---|---|
| 2,558,970 A * | 7/1951 | Lipfert | ........................... | 418/149 |
| 3,053,035 A * | 9/1962 | Earley | ............................ | 56/256 |
| 3,421,300 A * | 1/1969 | Rhodes | ......................... | 56/10.8 |
| 3,686,839 A * | 8/1972 | Lambert | ........................ | 56/11.6 |
| 4,170,099 A * | 10/1979 | Owens | ........................... | 56/16.9 |
| 4,965,990 A * | 10/1990 | Slawson et al. | ................ | 56/13.7 |
| 5,048,276 A * | 9/1991 | Miller | ............................ | 56/16.9 |
| 5,065,567 A * | 11/1991 | Wessel et al. | ................... | 56/13.7 |
| 5,090,142 A * | 2/1992 | Peters | ............................. | 37/243 |
| 5,226,284 A * | 7/1993 | Meehleder | ...................... | 56/11.6 |
| 5,497,606 A * | 3/1996 | Baxter | ............................ | 56/16.9 |
| 5,560,189 A * | 10/1996 | Devillier et al. | ............... | 56/13.6 |
| 6,701,700 B2 * | 3/2004 | Keane | ............................. | 56/16.9 |
| 7,658,057 B1 | 2/2010 | O'Dell | | |
| 7,900,428 B1 | 3/2011 | Maldonado | | |

* cited by examiner

*Primary Examiner* — Thomas B Will
*Assistant Examiner* — Mai Nguyen
(74) *Attorney, Agent, or Firm* — Dennis W. Beech

(57) ABSTRACT

The present invention is an edging and trimming apparatus for attachment to lawn mowing machines for use to edge and trim grass and weeds. A gear assembly enclosed in a housing may have a drive gear attached to a drive shaft of a lawn mower and may be engaged with a driven gear attached to a driven end of a shaft. A socket end of the shaft may be positioned in a hole in a side wall of a blade housing and the shaft may be attached to the blade housing by a first bracket to position the shaft approximately orthogonal to the drive shaft. A head coupling assembly with a trimmer head may be releasable attached to said socket end.

10 Claims, 6 Drawing Sheets

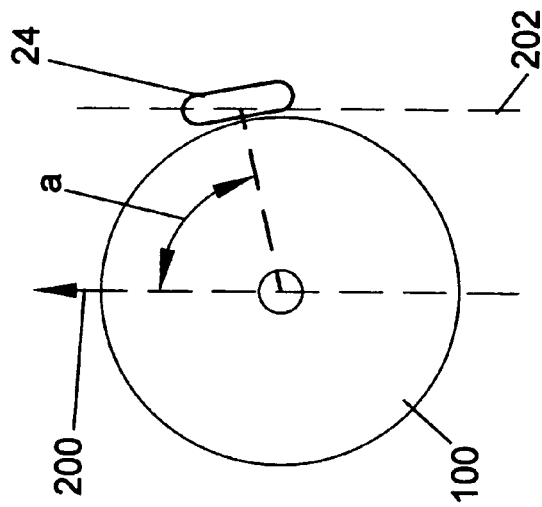
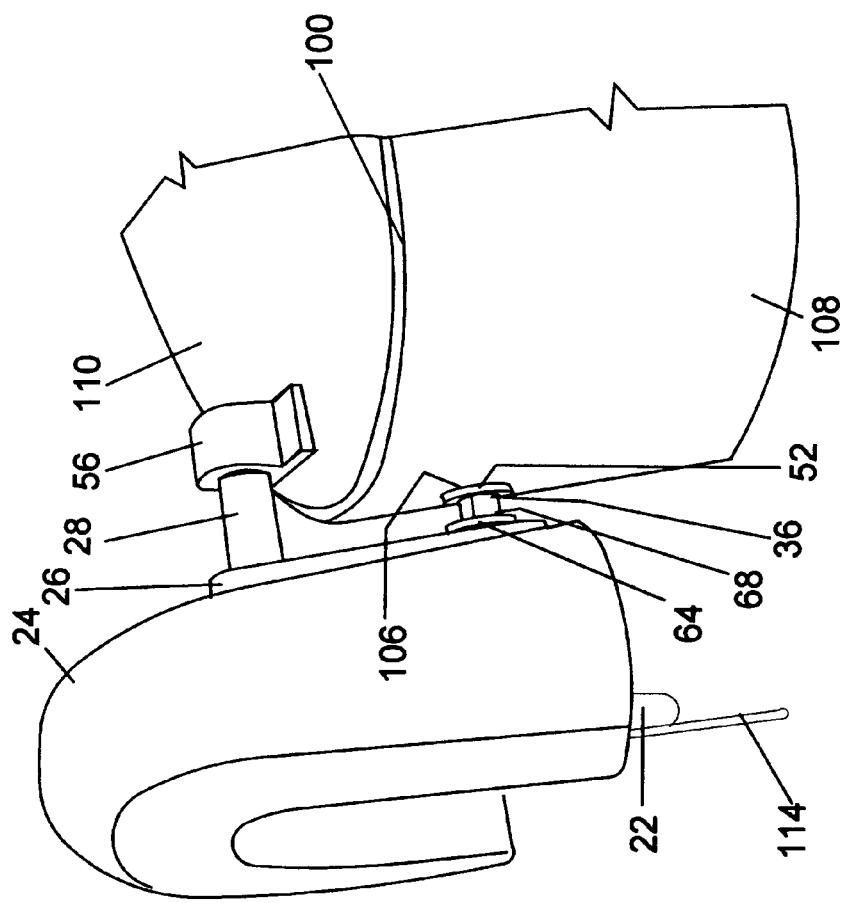
FIG. 5
FIG. 6

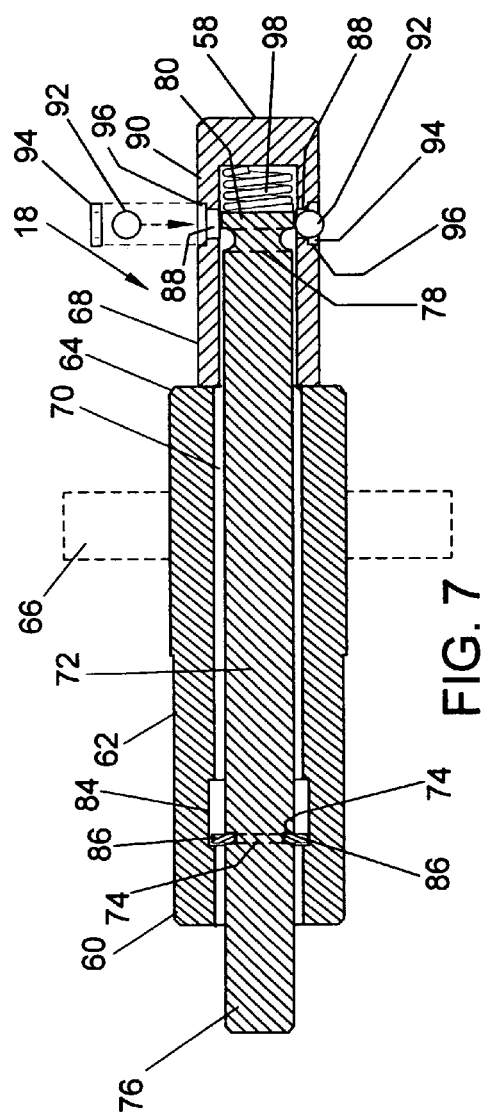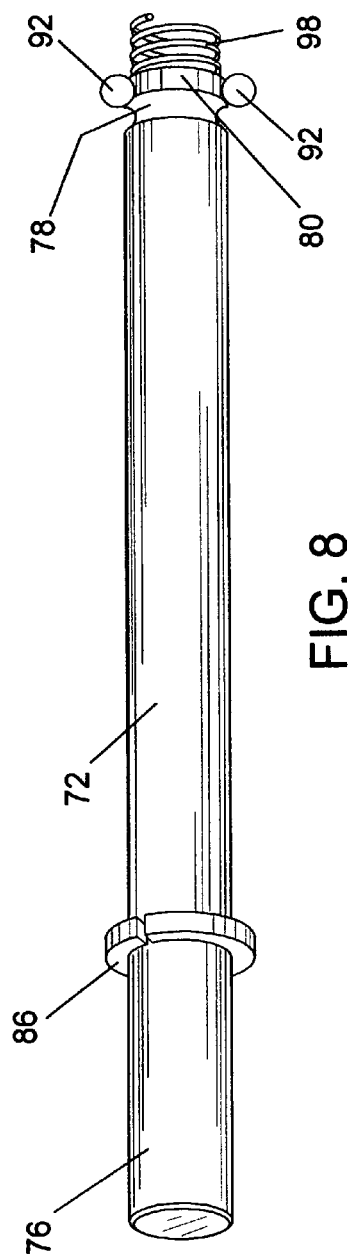

EDGING AND TRIMMING APPARATUS FOR ATTACHMENT TO LAWN MOWERS

BACKGROUND OF THE INVENTION

This invention relates to apparatus for attachment to lawn mowing machines for use to edge and trim grass and weeds at the edges of a lawn and grass area or adjacent to obstacles. The new apparatus attaches to a mower blade housing to extend outwardly from the side of a mower to rotate a cutting element adjacent the perimeter of the mower blade housing. The apparatus may be linked to the cutting blade power system of a lawn mower.

Edging and trimming apparatus for lawn mowers may currently be known. Specially designed apparatus for use with lawn mowers may use the lawn mowers power source or engine. A planar disc may be attached to the top of a grass cutting blade that is attached to the drive shaft of the mower engine. When the disc is rotated by the cutting blade rotation, a shaft having a rotatable end may be positioned to contact the surface of the rotating disc. Based on the friction contact between the disc surface and the shaft rotatable end and linkage structure to a cutting head, the cutting head may be caused to spin to rotate cutting strings for cutting grass. This type of structure may be inefficient due to the need for efficient friction contact between the shaft and the disc. Other elements of linkage may overcomplicate the simple, efficient operation of a trimmer head attached to a lawn mower.

SUMMARY OF THE INVENTION

The present invention is directed to apparatus for attachment to lawn mowing machines for use to edge and trim grass and weeds. A gear assembly enclosed in a housing may have a drive gear attached to a drive shaft of a lawn mower and may be engaged with a driven gear attached to a driven end of a shaft. A socket end of the shaft may be positioned in a hole in a side wall of a blade housing and the shaft may be attached to the blade housing by a first bracket to position the shaft approximately orthogonal to the drive shaft. A head coupling assembly with a trimmer head may be releasable attached to said socket end.

These and other features, aspects and advantages of the present invention will become better understood with reference to the following drawings, description and claims.

BRIEF DESCRIPTION OF THE DRAWINGS

FIG. 5 illustrates a perspective side partial view of a lawn mower blade housing with a trimmer head and guard attached according to an embodiment of the invention;

FIG. 6 illustrates a schematic top plan view of a blade housing with a trimmer head attached according to an embodiment of the invention;

FIG. 7 illustrates a side cross section view of a head coupling assembly according to an embodiment of the invention;

FIG. 8 illustrates a perspective side view of an attachment shaft according to an embodiment of the invention.

DETAILED DESCRIPTION

Figure 1:
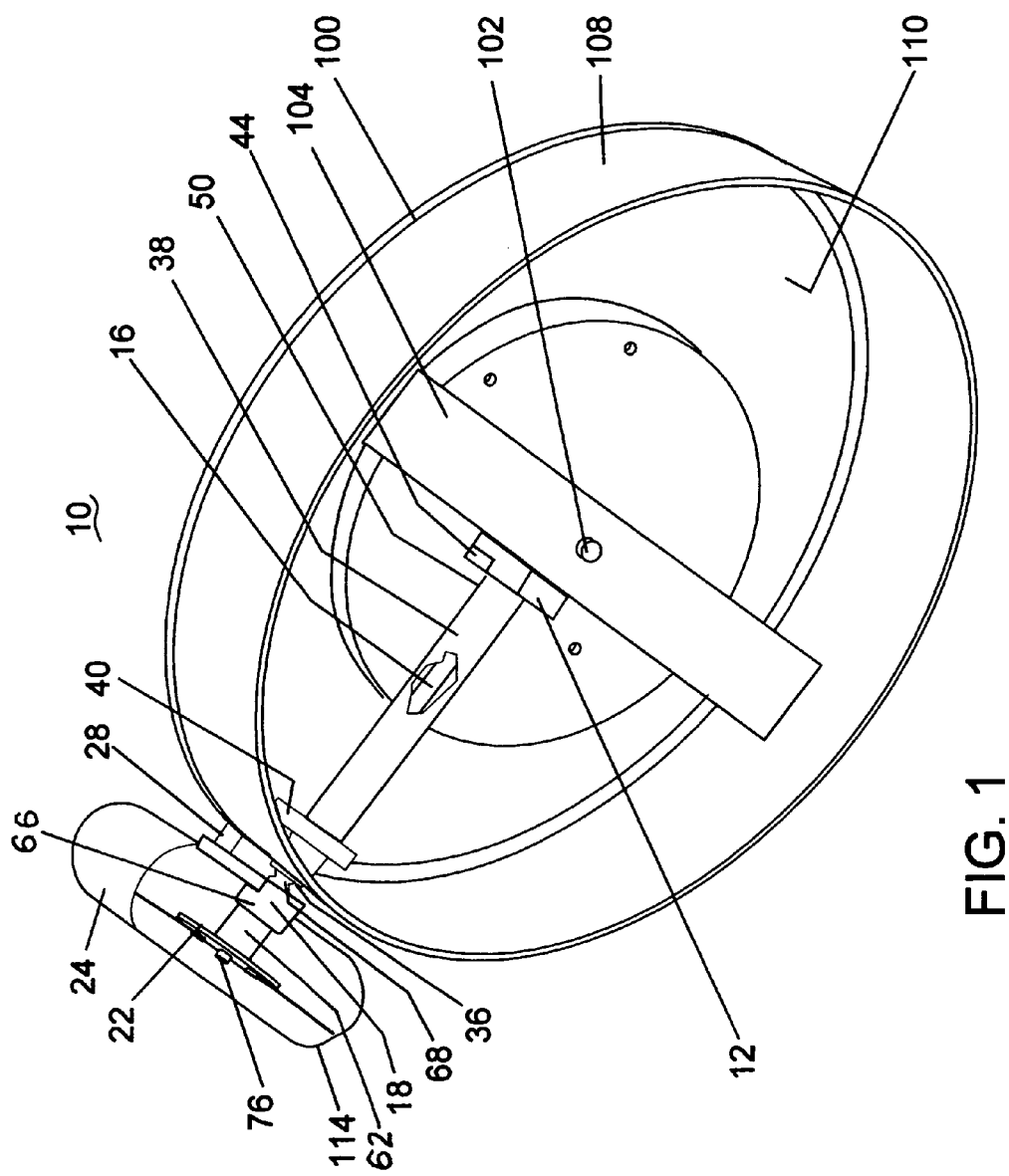
FIG. 1 illustrates a perspective bottom view of an edging and trimming apparatus attached to a lawn mower blade housing and drive shaft according to an embodiment of the invention.
Figure 2:
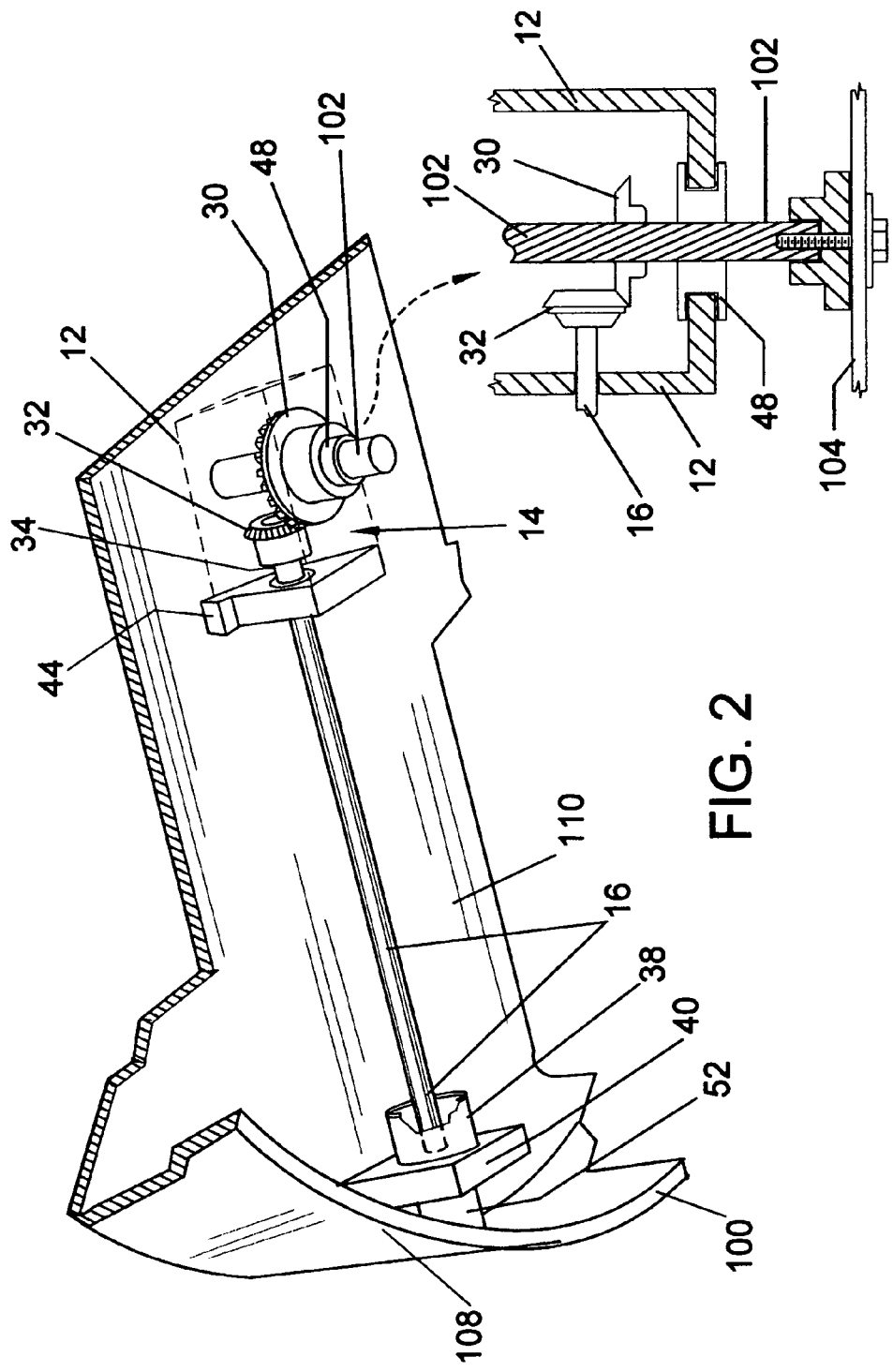
FIG. 2 illustrates a perspective bottom view of a shaft and gear assembly attached to a lawn mower blade housing and drive shaft according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 6, an edging and trimming apparatus 10 for attachment to lawn mowers may be used with lawn mowers that have a blade housing 100 with a motor (not shown) that drives a drive shaft 102 to rotate one or more rotor blades 104 positioned in the blade housing 100 and attached to the drive shaft 102. The apparatus 10 may have a gear housing 12 with a gear assembly 14 therein that is preferably a bevel gear to translate the rotary motion of the drive shaft 104 approximately orthogonally to a shaft 16 to transmit rotary motion to a hole 106 in the side wall 108 of the blade housing 100. A head coupling assembly 18 with a trimmer head 22 and trimmer guard 24 may be releasably attached to a socket end 36 attached to the shaft 16 at a shaft socket end 20.

The apparatus 10 positions a trimmer head 22 with cutting cord 114 adjacent to the side wall 108 of the blade housing 100. When a lawn mower having the trimming apparatus 10 attached is operated to cut grass, the trimming apparatus 10 can be used to trim the grass generally at the edges of a lawn and grass area or adjacent to obstacles. The trimmer head 22 may be positioned at an acute angle "a" relative to the direction of travel 200 of a lawn mower to avoid leaving a line 202 of uncut grass when trimming, see FIG. 6.

The gear housing 12 may be attached to the top wall 110 interior to the blade housing 100 or to the side of the second bracket 44 at bores 122. The gear assembly 14 may have a driving gear 30 attached to the drive shaft 102 above the position on the drive shaft 102 where the rotor blades 104 are attached. A driven gear 32 may be attached adjacent to a driven end 34 of the shaft 16 positioned for engagement with the driving gear 30. The driving gear 30 and driven gear 32 gear ratio may be chosen for a particular lawn mower to optimize the RPM of the shaft 16 for a desired cutting or trimming speed for the trimmer head 22. There may be a first bracket 40 attached to the top wall 110 adjacent the gear housing 12 and a second bracket 44 attached to the top wall 110 adjacent the side wall 108 for support of the trimmer tube 38 and the shaft 16 for rotation to transmit rotary motion to a socket end 36 attached to the shaft 16. The shaft 16 may be routed through the trimmer tube 38 that may be attached at a first end 50 at the first bracket 40 and at a second end 52 to the side wall 108.

A first bearing 42 may be positioned in the second end 52 of tube 38 and a second bearing 46 may be positioned in the first end 50 of the tube 38 to support rotational motion of shaft 16 in tube 38. There may be a catch ring 17 attached to shaft 16 adjacent the second bearing 46 to inhibit longitudinal movement of the shaft 16 in tube 38. Screws 120 may be used to attach the brackets 40, 44 and other elements, or welding may also be used. The trimmer tube 38 may inhibit debris and grass from interfering with the shaft 16 operation. There may be a housing sealing grommet 48 positioned in the drive shaft hole 112 of the gear housing 12 to seal around drive shaft 102.

Referring to FIGS. 1 and 4 through 8, the head coupling assembly 18 may have a cylindrical shaft 60 with a first portion 62 with an outside diameter for receipt of the trimmer head 22, a second or middle portion 64 for insertion in a trimmer bearing 66 that is attached to a trimmer guard bracket 26 for attachment of the trimmer guard 24, and a third portion 68 for insertion in a socket end 36 of the shaft 16. The head coupling assembly may have a coupling bore 70 therethrough for receipt of a releasable attachment shaft 72. The attachment shaft 72 may have a first groove 74 spaced a distance from a release pin end 76 and a second groove 78 adjacent a locking end 80.

There may be a catch ring bore 84 with a diameter larger than the coupling bore 70 formed in the coupling bore 70 positioned to receive a catch ring 86 positioned in the first groove 74 to retain the attachment shaft 72 in the coupling bore 70. The catch ring bore 84 may be long enough to allow lateral movement of the attachment shaft 72 in the coupling bore 70. There may be a ball lock hole 88 formed in the wall 90 of the third portion 68. A ball 92 may be positioned in the lock hole 88 and retained by a lock ring 94 in a groove 96. There may be a spring 98 positioned in the coupling bore 70 between the locking end 80 and a closed shaft end 58.

In operation the spring 98 biases the attachment shaft 72 against the catch ring 86 to urge the ball 92 into the ball lock hole 88 for a portion of the ball to extend outwardly of the shaft end 58. The exposed portion of the ball 92 may be positioned in a detent 54 of the socket end 36 of the shaft 16 to couple the head coupling assembly 18 to the shaft 16. To remove the head coupling assembly 18, trimmer head 22 and trimmer guard 24, the release pin end 76 may be pushed against the force of the spring 98 to urge the ball 92 into the release or second groove 78 to disengage the ball 92 from the detent 54.

Figure 3:
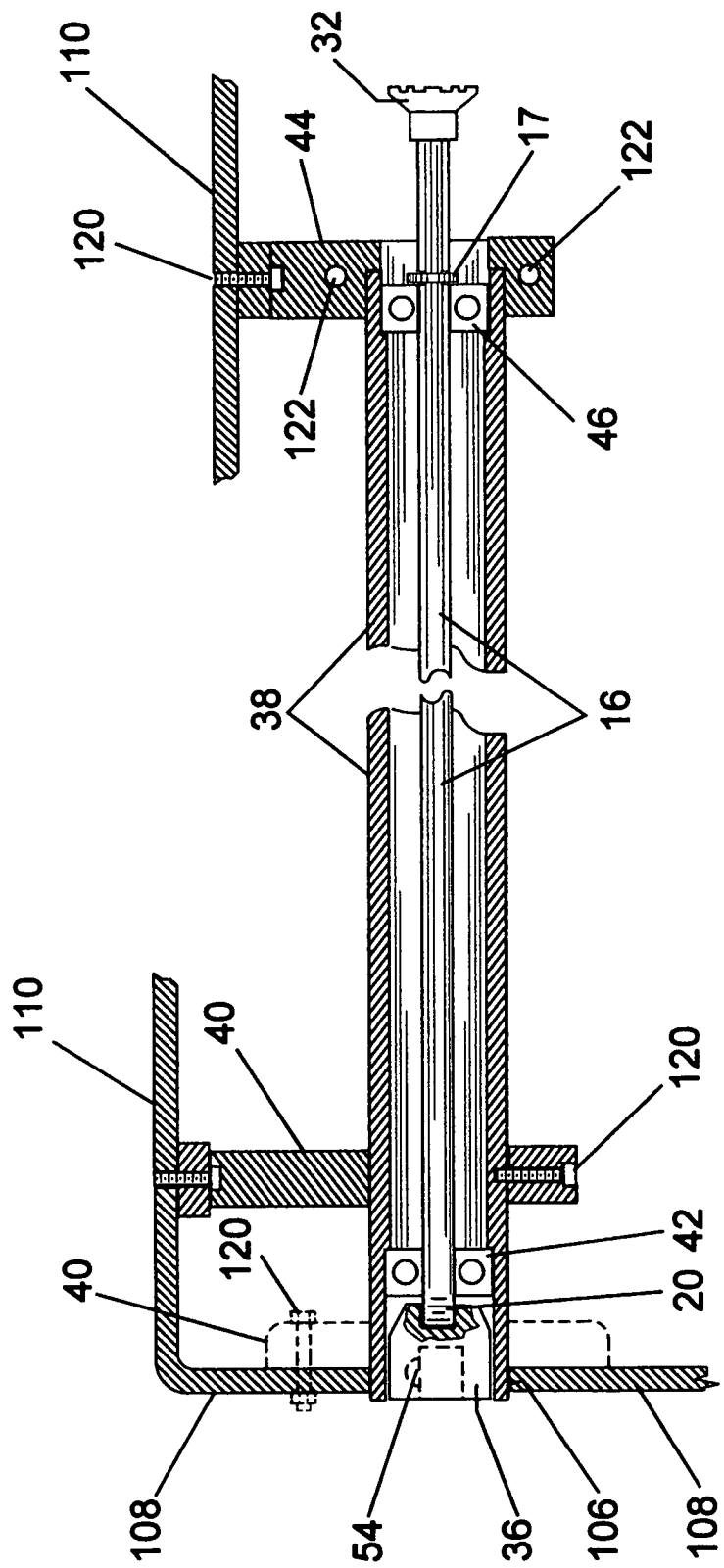
FIG. 3 illustrates a side partial cross section view of a blade housing and shaft with trimmer tube according to an embodiment of the invention.
Figure 4:
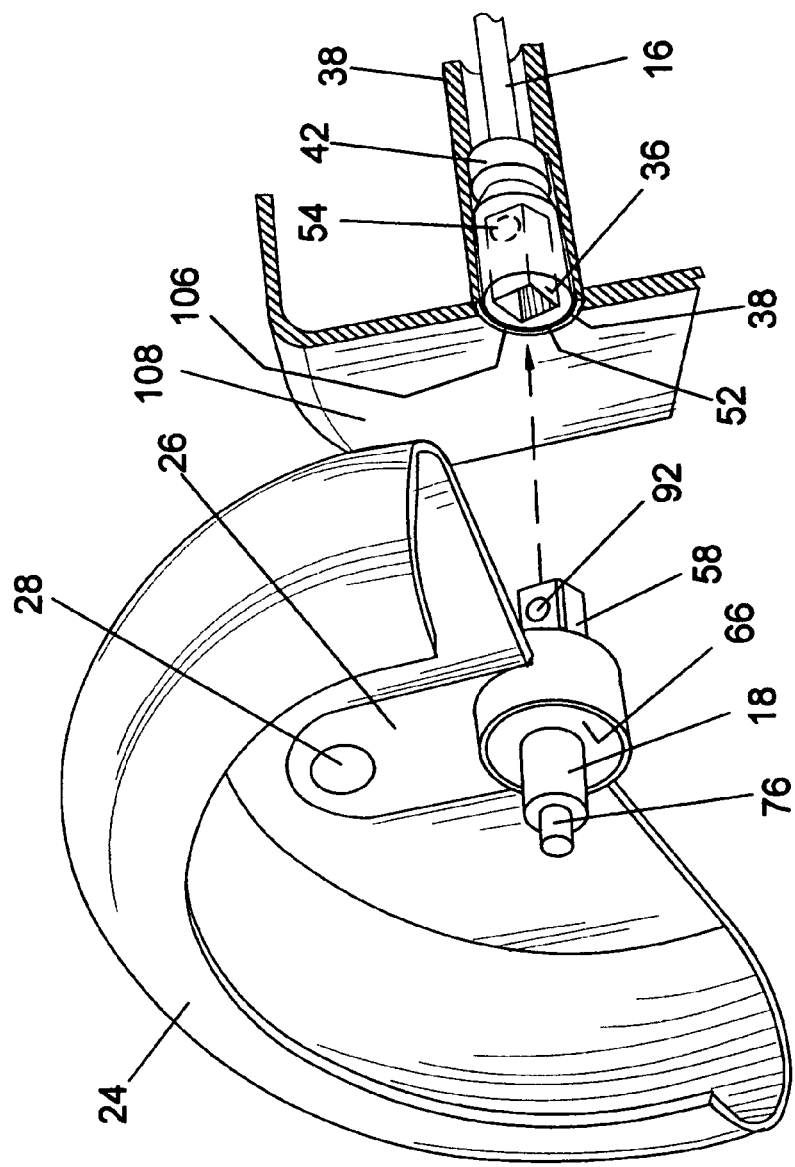
FIG. 4 illustrates a perspective exploded view of a head coupling assembly and trimmer guard relative to a partial view of a socket end of a shaft according to an embodiment of the invention.

There may be an anti-rotation pin 28 attached to the trimmer guard bracket 26 to project outwardly from the trimmer guard 24 for engagement with an anti-rotation bracket 56 attached to the top wall 110 of the blade housing 100 when the head coupling assembly 18 is coupled with the shaft 16, see FIG. 3. The elements of the head coupling assembly 18 and the anti-rotation pin 28 may allow ease of installation of the trimmer head and guard 22, 24 for use with a lawn mower when trimming is desired and removal when not requiring edge trimming.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for attachment to lawn mowing machines for use to edge and trim grass and weeds comprising:
   a gear assembly in a gear housing disposed in a blade housing with a driving gear attached to a drive shaft and engaged with a driven gear attached to a driven end of a shaft disposed in said blade housing;
   a shaft socket end of said shaft with a socket end having a detent therein, disposed in a side wall of the blade housing and said shaft attached to said blade housing by a first bracket with said shaft disposed approximately orthogonal to said drive shaft;
   a head coupling assembly comprising:
      a coupling shaft with a first portion having a trimmer head disposed thereon;
      a second portion of said coupling shaft has a trimmer bearing disposed thereon and a third portion of said coupling shaft with a closed end is shaped for insertion in said socket end; and
      a ball engagement apparatus having a ball movable between an engaged position to engage said detent in said socket end and a disengaged position to disengage said detent in said socket end, the ball engagement apparatus further comprising:
         an attachment shaft with a first groove spaced apart from a release pin end with a catch ring disposed in said first groove and with a second groove adjacent a locking end is slidably disposed in a coupling bore longitudinally formed in said coupling shaft with a first end open and said second end closed for said catch ring to be disposed in a catch ring bore formed in said coupling bore;
         a wall of said third portion of said coupling shaft having a ball lock hole therein with said ball disposed in said ball lock hole and retained by a lock ring disposed in a lock groove to allow a portion of said ball to protrude outwardly of said ball lock hole; and
         a spring disposed in said coupling bore between said locking end of said attachment shaft and said closed end of said coupling shaft.

2. The apparatus as in claim 1 wherein said gear assembly is a beveled gear assembly with a pair of toothed wheels.

3. The apparatus as in claim 1 wherein a trimmer guard is attached to said head coupling assembly.

4. The apparatus as in claim 1 wherein an anti-rotation pin is attached and disposed on said head coupling assembly to engage an anti-rotation bracket attached to said blade housing.

5. The apparatus as in claim 1 wherein a trimmer tube is disposed to enclose said shaft and is attached at a first end to said gear housing and at a second end to said side wall.

6. The apparatus as in claim 5 wherein:
   a first bearing is disposed in said second end of said trimmer tube;
   a second bearing is disposed in said first end of said trimmer tube; and
   said shaft is disposed in said first bearing and said second bearing.

7. The apparatus as in claim 1 wherein a housing sealing grommet is positioned in said gear housing having a shaft aperture therein through which said drive shaft extends.

8. The apparatus as in claim 1 wherein said coupling shaft is cylindrical.

9. The apparatus as in claim 1 wherein said third portion has an exterior quadrilateral shape.

10. The apparatus as in claim 1 wherein said socket end of said shaft is disposed in said side wall for said trimmer head to cut at an acute angle relative to a direction of travel of said blade housing.

* * * * *